(12) United States Patent
Ji

(10) Patent No.: US 10,694,220 B2
(45) Date of Patent: Jun. 23, 2020

(54) METHOD AND DEVICE FOR PROCESSING DATA

(71) Applicant: Alibaba Group Holding Limited, George Town (KY)

(72) Inventor: Wenjie Ji, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 19 days.

(21) Appl. No.: 16/234,430

(22) Filed: Dec. 27, 2018

(65) Prior Publication Data

US 2019/0132615 A1   May 2, 2019

Related U.S. Application Data

(63) Continuation of application No. PCT/CN2017/088547, filed on Jun. 16, 2017.

(30) Foreign Application Priority Data

Jun. 28, 2016  (CN) .......................... 2016 1 0490808

(51) Int. Cl.
*H04N 21/2187*   (2011.01)
*H04N 21/238*   (2011.01)
(Continued)

(52) U.S. Cl.
CPC ......... *H04N 21/2187* (2013.01); *H04N 5/775* (2013.01); *H04N 5/783* (2013.01);
(Continued)

(58) Field of Classification Search
CPC .. H04N 21/2187; H04N 21/238; H04N 21/24; H04N 21/23805; H04N 21/2407; H04N 21/845; H04N 5/783; H04N 5/775
See application file for complete search history.

(56) References Cited

U.S. PATENT DOCUMENTS 8,683,542 B1    3/2014  Henry
9,973,816 B2 *  5/2018  Crowe ............... H04N 21/4622
(Continued)

FOREIGN PATENT DOCUMENTS

CN    101472143    7/2009
CN    102421034    4/2012
(Continued)

OTHER PUBLICATIONS

International Search Report by the International Searching Authority issued in International Application No. PCT/CN2017/088547 dated Sep. 7, 2017; 9 pages.
(Continued)

*Primary Examiner* — Oschta I Montoya
(74) *Attorney, Agent, or Firm* — Fish & Richardson P.C.

(57) ABSTRACT

One example method includes executing a live data service that provides batches of live data to a plurality of terminal devices for display; providing a batch of live data and a first data displaying rate to a particular terminal device, wherein the particular terminal device displays the batch of live data at the first data displaying rate; after providing the batch of live data to the particular terminal device, determining that a transient issue exists with the live data service that prevents the live data service from providing additional batches of live data to the particular terminal device; estimating a resolution time representing an amount of time needed to resolve the transient issue with the live data service; calculating a second data displaying rate based on the resolution time and a size of the batch of live data provided to the particular terminal device.

17 Claims, 6 Drawing Sheets

(51) Int. Cl.
*H04N 21/24* (2011.01)
*H04N 5/783* (2006.01)
*H04N 5/775* (2006.01)
*H04N 21/845* (2011.01)

(52) U.S. Cl.
CPC ..... *H04N 21/238* (2013.01); *H04N 21/23805* (2013.01); *H04N 21/24* (2013.01); *H04N 21/2407* (2013.01); *H04N 21/845* (2013.01)

(56) References Cited

U.S. PATENT DOCUMENTS

| | | | |
|---|---|---|---|
| 2005/0084237 | A1 | 4/2005 | Kellner, Jr. et al. |
| 2009/0034633 | A1* | 2/2009 | Rodirguez ............ H04L 1/0041 375/240.28 |
| 2009/0178095 | A1* | 7/2009 | Zuo ....................... H04L 65/604 725/109 |
| 2014/0173055 | A1 | 6/2014 | Yu |
| 2014/0189756 | A1* | 7/2014 | Beals ................... H04N 21/631 725/68 |
| 2016/0127795 | A1 | 5/2016 | Mason et al. |
| 2016/0142742 | A1 | 5/2016 | Qian et al. |

FOREIGN PATENT DOCUMENTS

| | | |
|---|---|---|
| CN | 104065982 | 9/2014 |
| CN | 104079955 | 10/2014 |
| CN | 104080006 | 10/2014 |
| CN | 104205770 | 12/2014 |
| CN | 105100876 | 11/2015 |
| JP | 2010074726 | 4/2010 |
| JP | 2011066817 | 3/2011 |
| JP | 2012195831 | 10/2012 |
| TW | 201427398 | 7/2014 |
| TW | 201601528 | 1/2016 |

OTHER PUBLICATIONS

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

PCT International Preliminary Report on Patentability in International Application No. PCT/CN2017/088547, dated Jan. 1, 2019, 11 pages (with English Translation).

PCT Written Opinion of the International Searching Authority in International Application No. PCT/CN2017/088547, dated Sep. 7, 2017, 10 pages (with English translation).

European Extended Search Report in European Application No. 17819111.0, dated Mar. 27, 2019, 7 pages.

* cited by examiner

METHOD AND DEVICE FOR PROCESSING DATA

CROSS-REFERENCE TO RELATED APPLICATIONS

This application is a continuation of PCT Application No. PCT/CN2017/088547, filed on Jun. 16, 2017, which claims priority to Chinese Patent Application No. 201610490808.1, filed on Jun. 28, 2016, and each application is hereby incorporated by reference in its entirety.

TECHNICAL FIELD

The present application relates to the field of computer technologies and, in particular, to a method and a device for processing data.

BACKGROUND

Currently, in scenarios such as live streaming and live television (TV), a data live broadcast is widely applied (the data live broadcast is real-time display of data). Users can learn of corresponding information on time through the data live broadcast.

For example, a passenger flow volume in the Spring Festival transportation peak time can be displayed during the live TV and therefore, a user who watches the live TV can learn of the corresponding passenger flow volume in the Spring Festival transportation peak time. For another example, access traffic, a sales volume, etc. of a shopping website can be displayed on the website and therefore, a user who accesses the shopping website can learn of the access traffic and the sales volume on a corresponding page.

The live display of data is usually implemented by a live data service (the live data service runs on a corresponding server) on the server (or a server cluster). The live data service obtains data from a data source in real time, performs corresponding statistics processing to obtain live data, and sends the live data to a terminal device for display. It is worthwhile to note that an actual data live display process is essentially a time-delayed live broadcast. To be specific, there is a time difference between data displayed by the terminal device and data generated by the server, in other words, the live data displayed by the terminal device is usually generated by the server n seconds before.

However, in actual application scenarios, an exception may occur when the live data service runs (e.g., counting error or lagging), and corresponding service staff need to perform troubleshooting and recovery.

In the existing technology, when an exception occurs in the live data service, the server switches to a backup live data service to replace the abnormal live data service.

However, a "jump" or a rollback may occur in real-time data in the method of switching to the backup service for the following reason: the live data service running on the server buffers real-time data obtained from the data source, to perform corresponding statistics processing. If an exception occurs in the live data service and the live data service is replaced with the backup live data service, the real-time data stored in a buffer of the live data service is cleared, and the backup live data service buffers the real-time data again to perform statistics processing after the backup live data service runs. In this case, data statistics processing is repeatedly performed and therefore, a rollback occurs in the data live broadcast.

Using access traffic data as an example, an original live data service buffers real-time data $a_{900}$ to $a_{960}$ obtained from the data source, and performs statistics processing on the 60 pieces of data to generate access traffic data 900 to 960. Assume that the live data server generates access traffic data 930 to 950 based on real-time data $a_{930}$ to $a_{950}$, and sends the access traffic data to the terminal device for display. As shown in FIG. 1a, access traffic currently displayed by the terminal device based on the access traffic data sent by the server is 935.

If an exception occurs when the live data service generates access traffic data 955, the server stops the abnormal live data service, and enables a backup live data service to replace the abnormal live data service. After the backup live data service runs, the data buffered by the original live data service is cleared, and the backup live data service buffers the real-time data $a_{900}$ to $a_{960}$ again to perform statistics processing, generates access traffic data 900 to 920, and sends the access traffic data to the terminal device for display. In this case, after the terminal device displays access traffic 950 based on the access traffic data received previously (as shown in FIG. 1b), access traffic is rolled back to 900 based on the access traffic data 900 to 920 received recently, and the terminal device performs display starting from 900, as shown in FIG. 1c. It can be seen that this is the data rollback.

Apparently, such a method affects the live data displayed by the terminal device.

SUMMARY

Implementations of the present application provide a method for processing data, to reduce jumps, rollbacks, etc. caused by an exception in live data in the existing technology.

Implementations of the present application provide a device for processing data, to reduce jumps, rollbacks, etc. caused by an exception in live data in the existing technology.

The following technical solutions are used in the implementations of the present application:

An implementation of the present application provides a method for processing data, including the following: monitoring, by a server, a running status of a live data service; determining predicted recovery time when it is detected that an exception occurs in the running status; calculating a first rate based on the predicted recovery time; and sending the calculated first rate to a terminal device, so that the terminal device displays live data based on the first rate.

An implementation of the present application further provides a method for processing data, including the following: receiving, by a terminal device, a first rate sent by a server, where the first rate is calculated by the server based on predicted recovery time that is determined by the server when the server detects that an exception occurs in a running status; and displaying live data based on the first rate.

An implementation of the present application provides a device for processing data, including the following: a monitoring module, configured to monitor a running status of a live data service; a prediction module, configured to determine predicted recovery time when it is detected that an exception occurs in the running status; a calculation module, configured to calculate a first rate based on the predicted recovery time; and a sending module, configured to send the calculated first rate to a terminal device, so that the terminal device displays live data based on the first rate.

An implementation of the present application further provides a device for processing data, including the following: a receiving module, configured to receive a first rate sent by a server, where the first rate is calculated by the server based on predicted recovery time that is determined by the server when the server detects that an exception occurs in a running status; and a display module, configured to display live data based on the first rate.

The at least one technical solution used in the implementations of the present application can achieve the following beneficial effects:

When detecting that an exception occurs in the live data service, the server determines the predicted recovery time, calculates the first rate based on the predicted recovery time, and sends the first rate to the terminal device. The first rate can be used to control a display rate of displaying the live data by the terminal device. In other words, the display rate of displaying the live data by the terminal device can be decreased with the first rate, and the terminal device decreases the rate of displaying the live data based on the first rate. Therefore, it takes more time for the terminal device to display locally stored live data that is to be displayed. As such, on a server side, service staff have enough time to perform troubleshooting and recovery on the live data service running on the server.

In comparison with a method of switching to a backup live data service in the existing technology, the original live data service can be reserved (no service switching is performed) in the method of the present application. After the live data service returns to normal, the live data service further performs statistics processing based on real-time data buffered by the live data service. In other words, the real-time data buffered by the live data service is not cleared if no live data service switching is performed. As such, no exceptions such as a live data rollback and a live data jump occur.

In addition, an end user is not significantly aware of a change such as a jump, a rollback, or stagnancy of the live data.

BRIEF DESCRIPTION OF DRAWINGS

The accompanying drawings here are used to provide further understanding of the present application, and constitute a part of the present application. Example implementations of the present application and descriptions of the implementations are used to explain the present application, and do not constitute an improper limitation on the present application. In the accompanying drawings.

DESCRIPTION OF IMPLEMENTATIONS

Figure 1A:
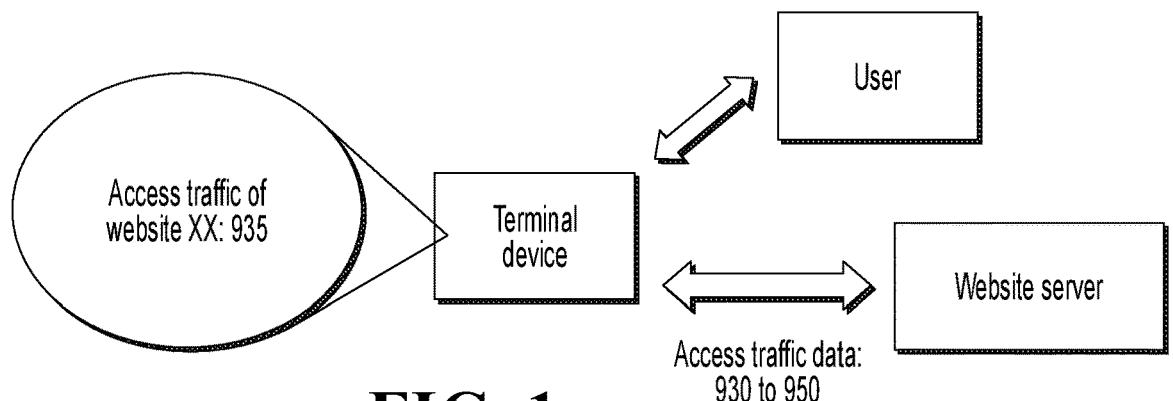
FIG. 1a to FIG. 1c are schematic diagrams illustrating a data live broadcast in the existing technology.
Figure 1B:
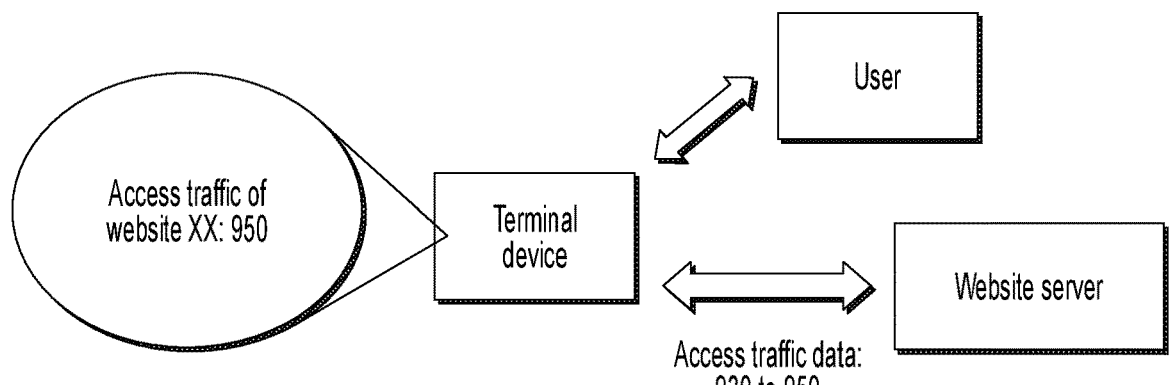
Figure 1C:
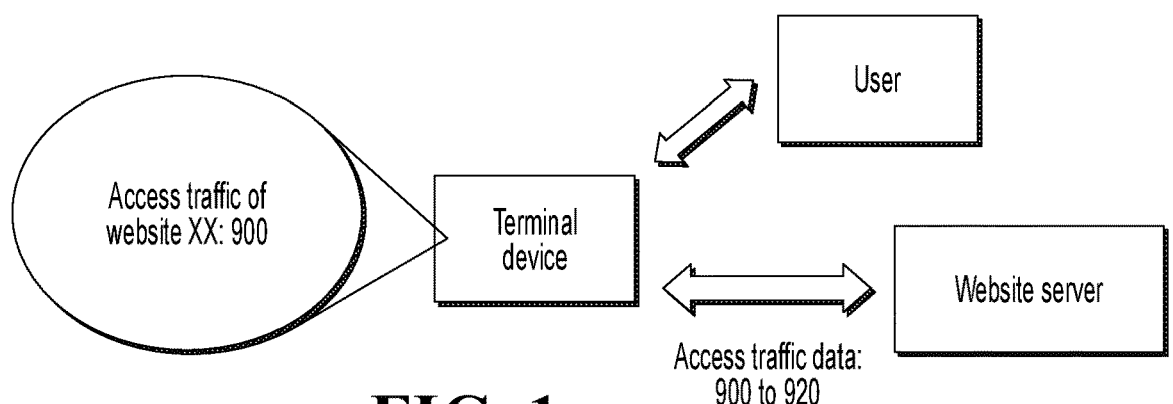

To make the objectives, technical solutions, and advantages of the present application clearer, the following clearly and comprehensively describes the technical solutions of the present application with reference to the specific implementations and the corresponding accompanying drawings of the present application. Apparently, the described implementations are some rather than all of the implementations of the present application. All other implementations obtained by a person of ordinary skill in the art based on the implementations of the present application without creative efforts shall fall within the protection scope of the present application.

As described above, in a data live broadcast scenario, live data generated by a server is constantly sent to a terminal device, so that the terminal device can perform data live display based on the live data. However, after an exception occurs in a live data service on a server side, the server switches to a backup service, which causes a change such as a data rollback or a data jump in the data live broadcast process, thereby affecting normal running of the data live broadcast.

In view of this, a method for reducing data rollbacks or data jumps in a data live broadcast process is needed. Therefore, the implementations of the present application provide a method for processing data, so that no data rollback or data jump occurs even when an exception occurs in a live data service on a server, thereby ensuring normal running of a data live broadcast.

In the implementations of the present application, the server can be a server that can provide a live data service, including but not limited to a web site server, a data center server, etc. The server can work independently (only one server provides a live data service), or can work in a cluster. The terminal device can be a terminal device of a user with a data display function, for example, a mobile phone, a tablet computer, a smart TV, or a computer. In some actual application scenarios, the terminal device can be a large display device (e.g., a device with a large screen in a live hall). The terminal device is not limited here to the present application.

In addition, it is worthwhile to note that, the live data service on the server usually generates live data in batches, in a process of performing statistics processing to generate live data. In other words, the live data service generates a certain amount of live data at a very short time interval. For example, the live data service generates 2000 pieces of live data after 15 ms of the last generation of live data. In practice, a time interval of generating live data by the live data service each time and an amount of live data generated each time are related to real-time data of a data source and running load of the server. Implementations are not limited to the present application.

When the live data service on the server runs normally, a process of displaying live data by the terminal device is detailed as follows:

First, the terminal device interacts with the server to obtain live data.

In a method of the implementations of the present application, the terminal device periodically obtains the live data from the server at a very short time interval. For example, the terminal device obtains the live data from the server every 0.5 s. In this method, the terminal device actively obtains the data from the server. In practice, this method is applicable to scenarios that the server provides a data live service for many terminal devices.

In another method, the terminal device keeps a persistent connection to the server. After the live data service on the server generates live data each time, the server sends the newly generated live data to the terminal device through the persistent connection established between the server and the terminal device. In practice, the method of establishing a persistent connection between the terminal device and the server is more applicable to scenarios such as a data live hall and a centralized data live broadcast. When there are many terminal devices, the work load of the server can be significantly increased if the server keeps a persistent connection to each terminal device. In practice, if the server can bear enough work load, the method of establishing a persistent connection can also be used in the case of many terminal devices. Implementations are not limited to the present application.

After obtaining the live data, the terminal device displays the live data.

Based on the previously described content, the live data obtained by the terminal device is a batch of live data (the batch of live data includes a plurality of pieces of data) generated by the data live service. After obtaining the live data, the terminal device locally buffers the live data, and displays the live data based on a rate specified by the server. For example, in a data live broadcast process of website access traffic, a batch of access traffic data obtained by the terminal device from the server includes access traffic data 300 to 350, and the server specifies that a display rate of the access traffic data is to change every is (to increase five pieces of data each time). In this case, if the terminal device displays access traffic 300 at 08:01:10, access traffic displayed by the terminal device at 08:01:11 is 305.

The technical solutions provided in the implementations of the present application are described in detail below with reference to the previously described content.

Figure 2A:
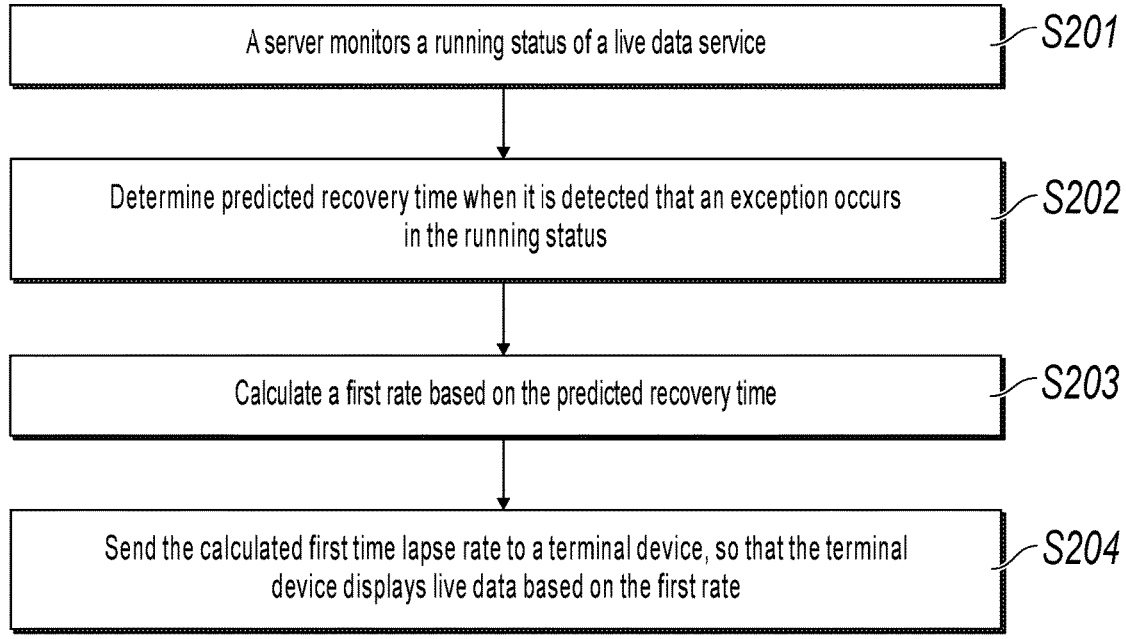
FIG. 2a is a schematic diagram illustrating a data processing process, according to an implementation of the present application.

FIG. 2a illustrates a data processing process in the implementations of the present application, and the process specifically includes the following steps.

S201. A server monitors a running status of a live data service.

The live data service runs on the server. The live data service obtains real-time data from a data source, and performs corresponding statistics processing to generate live data for display. In practice, the live data service processes a large amount of data. Therefore, in a running process, there may be a back end call conflict, or operation may be choppy because of many operations, resulting in abnormal running of the live data service. It can be understood that, after an exception occurs in the live data service, live data generated by the live data service is abnormal.

Therefore, the server monitors the running status of the live data service, to take corresponding measures when an exception occurs in the live data service, thereby reducing exceptions such as an obvious jump or rollback of live data displayed by a terminal device.

S202. Determine predicted recovery time when it is detected that an exception occurs in the running status.

In practice, if an exception occurs in the live data service, corresponding service staff can perform operations such as troubleshooting and recovery. It takes some time to perform the troubleshooting or recovery operation. Therefore, the server determines duration (the predicted recovery time) between occurrence of an exception in the live data service and a predicted recovery time.

S203. Calculate a first rate based on the predicted recovery time.

It is worthwhile to note that the first rate in this implementation of the present application can be a change rate of the live data. For example, the live data changes every ns.

Alternatively, the first rate can be a magnitude of each change of the live data. For example, n pieces of live data are increased once or n pieces of live data are decreased once.

Alternatively, the first rate can be a time lapse rate. To be specific, an actual time is used as a reference, and the first rate is determined by multiplying a rate coefficient by a unit time. For example, it can be specified that 1 s for the first rate=1.5*1 s in the actual time. In other words, is in the terminal device is 1.5 s in the actual time with the first rate. The optional methods of the first rate do not constitute a limitation on the present application.

Considering the previously described content, when the terminal device displays the live data, because a display rate is specified by the server, the terminal device displays the live data obtained by the terminal device based on the display rate specified by the server. Therefore, when an exception occurs in the live data service on the server, if the display rate of the live data is decreased for the terminal device, the service staff can have more time to perform troubleshooting or recovery on the live data service.

For example, if normally the terminal device locally stores access traffic data 300 to 350, and the terminal device performs live display by updating live data every is (assume that five pieces of access traffic data are increased once), duration of 10 s is usually needed for displaying the access traffic 300 to 350 by the terminal device. If an exception occurs in the live data service on the server, and the server learns of the first rate through calculation based on the predicted recovery time: to change every 2 s (to increase five pieces of access traffic data), duration of 20 s is needed for displaying the access traffic 300 to 350 by the terminal device based on the first rate.

It can be seen from the previous example that, with the first rate, the display duration of displaying the live data is 10 s more than that in a normal state. In the case, the back end service staff have 10 s to perform troubleshooting or recovery on the live data service. The previous example merely describes a function of the first rate. In practice, the first rate can be predicted based on the predicted recovery time. Implementations are not limited to the present application.

S204. Send the calculated first time lapse rate to a terminal device, so that the terminal device displays live data based on the first rate.

After obtaining the first rate as described above, the server sends the first rate to the terminal device, so that the terminal device displays the live data obtained by the terminal device based on the first rate. For details, references can be made to the previous example.

In the previous steps, when detecting that an exception occurs in the live data service, the server determines the predicted recovery time, calculates the first rate based on the predicted recovery time, and sends the first rate to the terminal device. The first rate can be used to control the display rate of displaying the live data by the terminal device. In other words, the display rate of displaying the live data by the terminal device can be decreased with the first rate, and the terminal device decreases the rate of displaying the live data based on the first rate. Therefore, it takes more time for the terminal device to display locally stored live data that is to be displayed. As such, on a server side, the service staff have enough time to perform troubleshooting and recovery on the live data service running on the server.

In comparison with a method of switching to a backup live data service in the existing technology, the original live data service can be reserved (no service switching is performed) in the method of the present application. After the live data service returns to normal, the live data service further performs statistics processing based on real-time data buffered by the live data service. In other words, the real-time data buffered by the live data service is not cleared if no live data service switching is performed. As such, no exceptions such as a live data rollback and a live data jump occur.

It is worthwhile to note that the steps in the method provided in the previous implementation can be performed by one device, specifically, the server.

The following describes in detail a case when an exception occurs in the live data service.

It is worthwhile to note that, in practice, when an exception occurs in the live data service, troubleshooting or recovery is usually performed on the abnormal live data service manually. In this process, the corresponding service staff determine predicted recovery time. In an optional method, the server provides a corresponding diagnosis interface, and the interface provides an option of the predicted recovery time. When performing troubleshooting or recovery, the service staff can enter the corresponding predicted recovery time in the option.

In this implementation of the present application, the determining predicted recovery time specifically includes the following: determining a predicted recovery time; determining a time when an exception occurs in the running status of the live data service; and determining the predicted recovery time based on the determined predicted recovery time and the determined time.

For example, if the time when an exception occurs in the live data service is 12:08:02, and the recovery time predicted by the service staff is 12:08:40, the predicted recovery time is 38 s.

After the predicted recovery time is determined, the first time lapse rate can be further calculated. Specifically, a time of stopping displaying the live data by the terminal device when an exception occurs in the running status of the live data service is determined, and the first rate is determined based on the determined time of stopping displaying the live data by the terminal device and the predicted recovery time.

Longer predicted recovery time indicates a lower first rate. For ease of description, the predicted recovery time is referred to as $T_{yu}$ below.

It is worthwhile to note that, when an exception occurs in the live data service, the server stops sending live data to the terminal device, and the terminal device displays local live data at the original display rate. It can be understood that, after a period of time, the terminal device can complete displaying local live data that is not displayed. Therefore, the terminal device stops updating live data after displaying the last live data (because in this case, the terminal device has displayed all live data locally buffered, and has not obtained new live data provided by the server), which is represented as follows: the live data displayed by the terminal device stops at a value. For example, access traffic displayed by the terminal device stops at 500.

Therefore, in this implementation of the present application, when an exception occurs in the running status of the live data service, the server determines duration between a current time and the time of stopping updating the live data by the terminal device (for ease of description, duration between occurrence of an exception in the live data service and stopping updating the live data by the terminal device is referred to as $T_{c1}$ below). In an optional method of this implementation of the present application, the display rate of displaying the live data by the terminal device is specified by the server, and therefore, the server can learn of the display rate of the terminal device. In addition, because a time when the live data service on the server performs statistics processing to generate live data each time is recorded (e.g., in a corresponding data log), and an amount of live data corresponding to the time is also recorded, the server can determine a time of generating live data that is sent to the terminal device last time, and therefore, the server can determine an amount of live data stored in the terminal device. It can be understood that both the amount of live data stored in the terminal device and the display rate are known and therefore, the server can determine $T_{c1}$.

$T_{c1}$ can be considered as time duration for displaying the live data by the terminal device when the display rate is unchanged, but after $T_{c1}$, the terminal device stops updating the live data, which causes a display exception to the data live broadcast. Because $T_{yu}$ is the time duration that the back end service staff may need to perform recovery, in this implementation of the present application, the first rate is determined based on $T_{c1}$ and $T_{yu}$, so that $T_{c1}$ is prolonged with the first rate.

Assume that a display rate of displaying access traffic data of a website by the terminal device is to increase 10 pieces of data every second, and access traffic data obtained by the terminal device from the server currently includes 1000 to 1200. If an exception occurs in the live data service running on the server when the display displays the access traffic 1000, the terminal device cannot continue to obtain access traffic data from the server. It can be seen that, duration $T_{c1}$ of 20 s is needed for displaying the access traffic 1000 to the access traffic 1200 by the terminal device at the display rate. However, because the predicted recovery time $T_{yu}$ is 40 s, the current display rate of the terminal device needs to be adjusted to reduce data stagnancy after 20 s.

In this example, first rate=$T_{c1}/T_{yu}$*current display rate=0.5*10=5.

In other words, the first rate is to increase five pieces of data every second. Apparently, duration needed for displaying the access traffic 1000 to the access traffic 1200 by the terminal device based on the first rate is 40 s and the original display duration is prolonged.

The previous method is a description of a case that the first rate indicates a change to an amount of live data. If the first rate is a time lapse rate, the first rate can be calculated in the following way:

First rate(time lapse rate of the client)=[(time difference between the server and the client*client time)/$T_{yu}$]+original time lapse rate of the client.

Figure 2B:
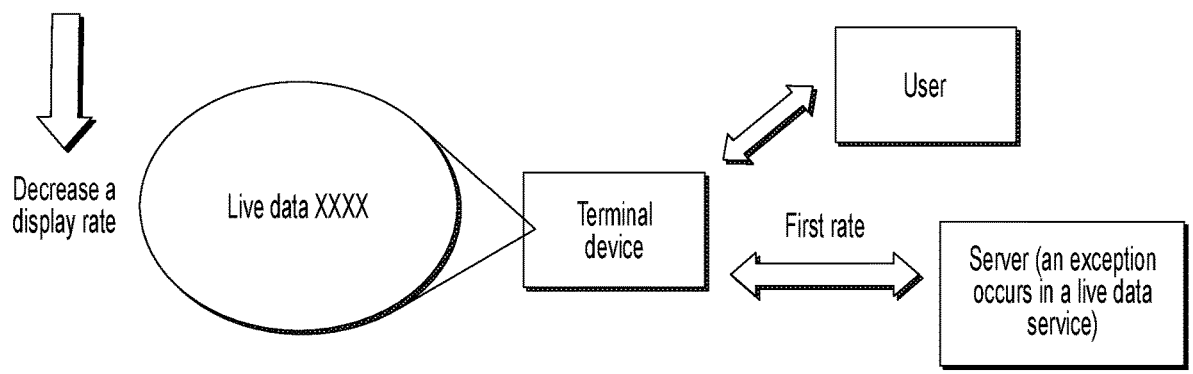
FIG. 2b to FIG. 2d are schematic diagrams illustrating a process of adjusting a display rate of a terminal device by a server, according to an implementation of the present application.

The previously described content is a process of adjusting the display rate of the terminal device when an exception occurs in the live data service. Specifically, as shown in FIG. 2b, in the previous process, the display rate of the terminal device is essentially decreased based on the calculated first rate. In actual application scenarios, after the back end service staff recover the live data service, the live data service normally performs statistics processing on real-time data to generate corresponding live data, and sends the live data to the terminal device. The terminal device displays the live data at a relatively low display rate based on the first rate. After the terminal device can normally receive live data sent by the server, the terminal device can increase the display rate to adapt to new live data.

The following describes in detail a process after the live data service is recovered.

In the previous recovery process, the service staff predicts a time (the predicted recovery time) when the live data service can be recovered. In actual application scenarios, a time difference may exist between an actual recovery time of the live data service and the recovery time predicted by the service staff. For example, if the recovery time predicted by the service staff is 12:08:40, and the live data service is actually recovered at 12:07:50, a time difference of 50 s exists between the two times.

In practice, because the first rate is determined based on the predicted recovery time, if a time difference exists between the actual recovery time of the live data service and the predicted recovery time, an increment in the display rate of the terminal device needs to be determined based on the time difference, that is, a second rate is determined.

Therefore, after the live data service is recovered, the method further includes the following: determining a recovery time difference when it is detected that the running status of the live data service returns to normal; calculating a second rate based on the recovery time difference; and sending the calculated second time lapse rate to the terminal device, so that the terminal device displays the live data based on the second rate.

It can be seen from the previously described content that the determining a recovery time difference specifically includes the following: determining a time when the running status of the live data service returns to normal; and determining the recovery time difference based on the time when the running status of the live data service returns to normal and the predicted recovery time.

In the previous example, if an exception occurs in the live data service at 12:01:00, the predicted recovery time is 12:01:40 because the predicted recovery time is 40 s, but the actual recovery time of the live data service is 12:01:20 (new access traffic data is generated at this time). In other words, the live data service is recovered 20 s earlier than the predicted recovery time. In this case, the terminal device has 100 pieces of access traffic data that is not displayed. After the live data service normally runs, the server needs to adjust the current display rate (the first rate) of the terminal device so that the terminal device can adapt to new access traffic data generated by the live data service after the live data service normally runs. In this case, the terminal device accelerates display of remaining access traffic data (in other words, the second rate is generated).

It can be understood that a smaller recovery time difference indicates a higher second rate.

Likewise, the previous method is a description of a case where the second rate indicates a change to an amount of live data. If the second rate is a time lapse rate, the second rate can be calculated in the following way:

Second rate(time lapse rate of the client)=[(actual recovery time−client time)*$T_{yu}$/actual recovery time difference]+first rate.

Figure 2C:
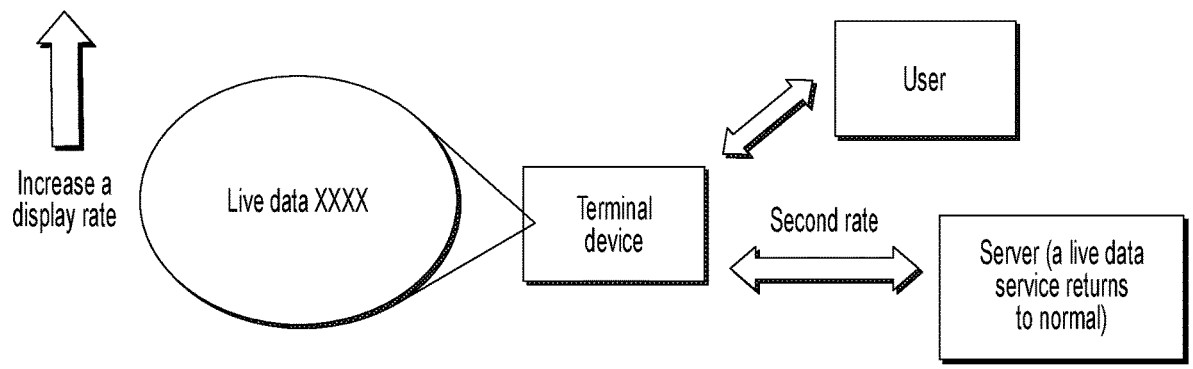

The process of adjusting the display rate of the terminal device when the live data service returns to normal is described above. A detailed process is shown in FIG. 2c.

Figure 2D:
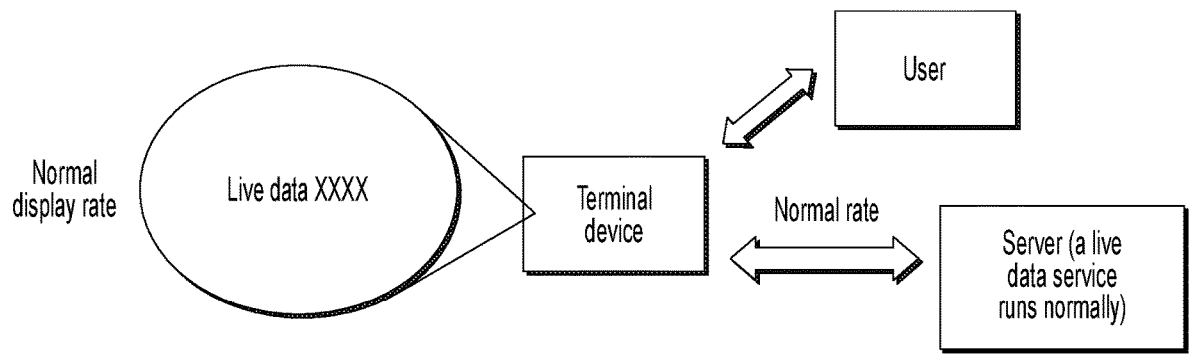

After the terminal device accelerates display of remaining live data (and receives new live data), the server sends a normal rate to the terminal device again, so that the terminal device displays live data based on the normal rate. This process is shown in FIG. 2d.

In addition, it is worthwhile to note that in actual application scenarios, the actual recovery time of the live data service can be later than the predicted recovery time. For example, if an exception occurs in the live data service at 12:01:00, and the predicted recovery time is 12:01:40, but the live data service actually returns to normal at 12:02:20. Apparently, in this case, if the terminal device displays live data only based on the first rate calculated in the previous method, live data display may still be stopped. Therefore, in this implementation of the present application, the first rate can be dynamically adjusted to reduce such cases. In other words, a plurality of first rates can be calculated and sent to the terminal device.

For example, continuing with the previous example about the first rate, it can be seen from the previous example that a first rate generated the first time is to increase five pieces of access traffic data every second, and the live data service is still not recovered after 10 s (in this case, access traffic displayed by the terminal device is 1150, and 150 pieces of access traffic data are left and can be all displayed in 30 s). Therefore, the server can calculate a new first rate (which is used to prolong the display duration of the terminal device). If the new first rate is to increase two pieces of access traffic data every second, the display duration of the terminal device can be prolonged to 75 s.

The previous example is merely a possible method for actual application scenarios in this implementation of the present application, and does not constitute a limitation on the present application.

In the previously described content, when an exception occurs in the live data service on the server, the server can decrease a current display rate of the terminal device, and prolong troubleshooting or recovery time of the back end staff, without making an end user significantly aware of a change such as a jump, a rollback, or stagnancy of the live data. Correspondingly, after the live data service is recovered, the display rate of the terminal device can be increased, so that the terminal device can adapt to new live data sent by the server.

On a terminal device side, the present application provides a method for processing data. Specifically, when an exception occurs in a live data service on a server, the method includes the following steps.

Step 1: A terminal device receives a first rate sent by the server, where the first rate is calculated by the server based on predicted recovery time that is determined by the server when the server detects that an exception occurs in a running status.

Step 2: Display live data based on the first rate.

When the live data service on the server returns to normal, the method further includes the following: receiving, by the terminal device, a second rate sent by the server, where the second rate is calculated by the server based on a recovery time difference that is determined by the server when the server detects that the running status of a live data service returns to normal; and displaying the live data based on the second rate.

For an implementation process where the terminal device side obtains the live data and displays the live data based on different rates, references can be made to the previously described content. Details are omitted here.

The method for processing data provided in the implementations of the present application is described above. Based on the same idea, an implementation of the present application further provides a device for processing data.

Figure 3:
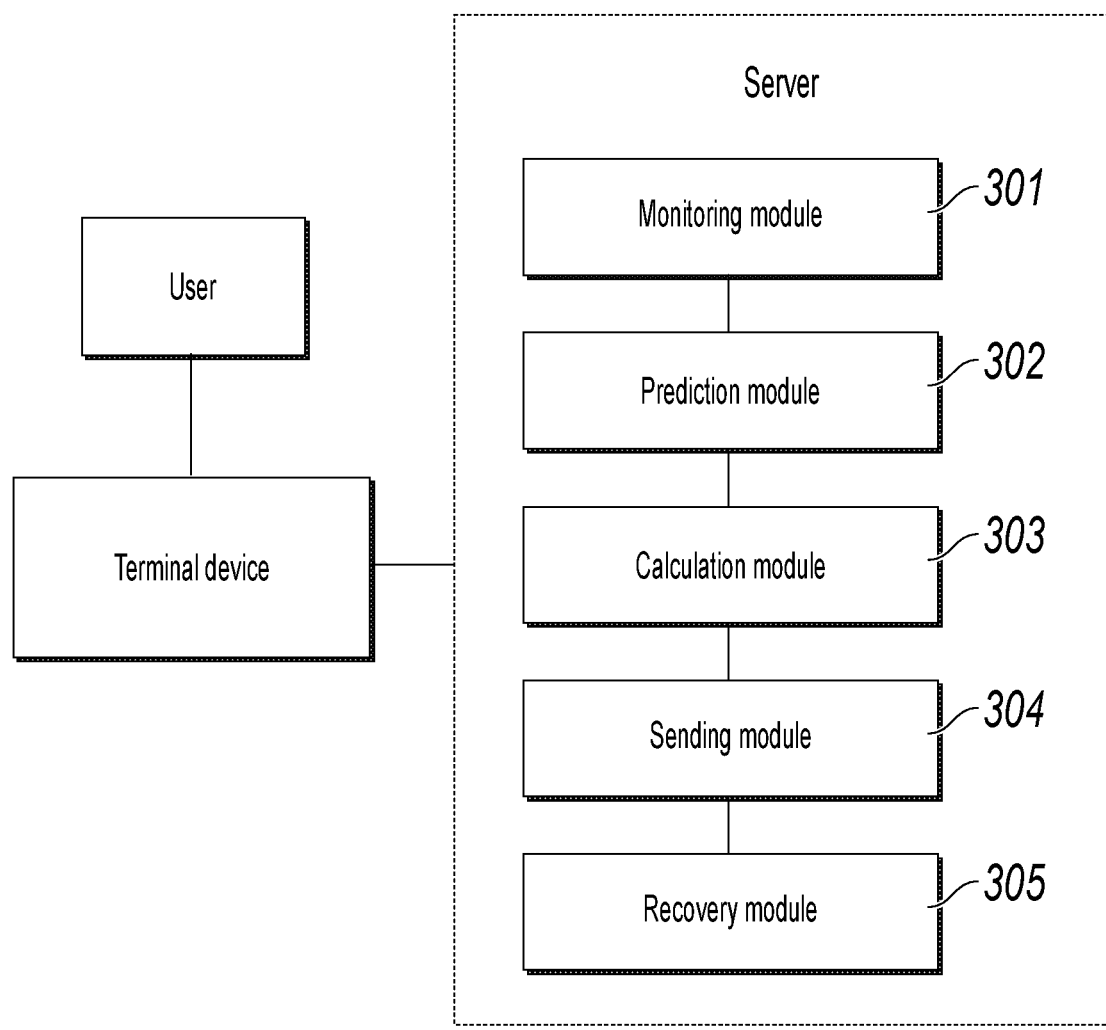
FIG. 3 is a schematic structural diagram illustrating a device for processing data on a server side, according to an implementation of the present application.

As shown in FIG. 3, the device for processing data is disposed on a server side, and the device includes the following: a monitoring module 301, configured to monitor a running status of a live data service; a prediction module 302, configured to determine predicted recovery time when it is detected that an exception occurs in the running status; a calculation module 303, configured to calculate a first rate based on the predicted recovery time; and a sending module 304, configured to send the calculated first rate to a terminal device, so that the terminal device displays live data based on the first rate.

Specifically, the prediction module 302 determines a predicted recovery time, determines a time when an exception occurs in the running status of the live data service, and determines the predicted recovery time based on the determined predicted recovery time and the determined time.

Furthermore, the prediction module 302 determines a time of stopping updating the live data by the terminal device when an exception occurs in the running status of the live data service, and determines the first rate based on the determined time of stopping displaying the live data by the terminal device and the predicted recovery time.

Longer predicted recovery time indicates a lower first rate.

The device further includes the following: a recovery module 305, configured to determine a recovery time difference when it is detected that the running status of the live data service returns to normal; calculate a second rate based on the recovery time difference; and send the calculated second time lapse rate to the terminal device, so that the terminal device displays the live data based on the second rate.

Furthermore, the recovery module 305 determines a time when the running status of the live data service returns to normal; and determines the recovery time difference based on the time when the running status of the live data service returns to normal and the predicted recovery time.

Based on this, the calculation module 303 determines the second rate based on the recovery time difference and the first rate.

A smaller recovery time difference indicates a higher second rate.

Figure 4:
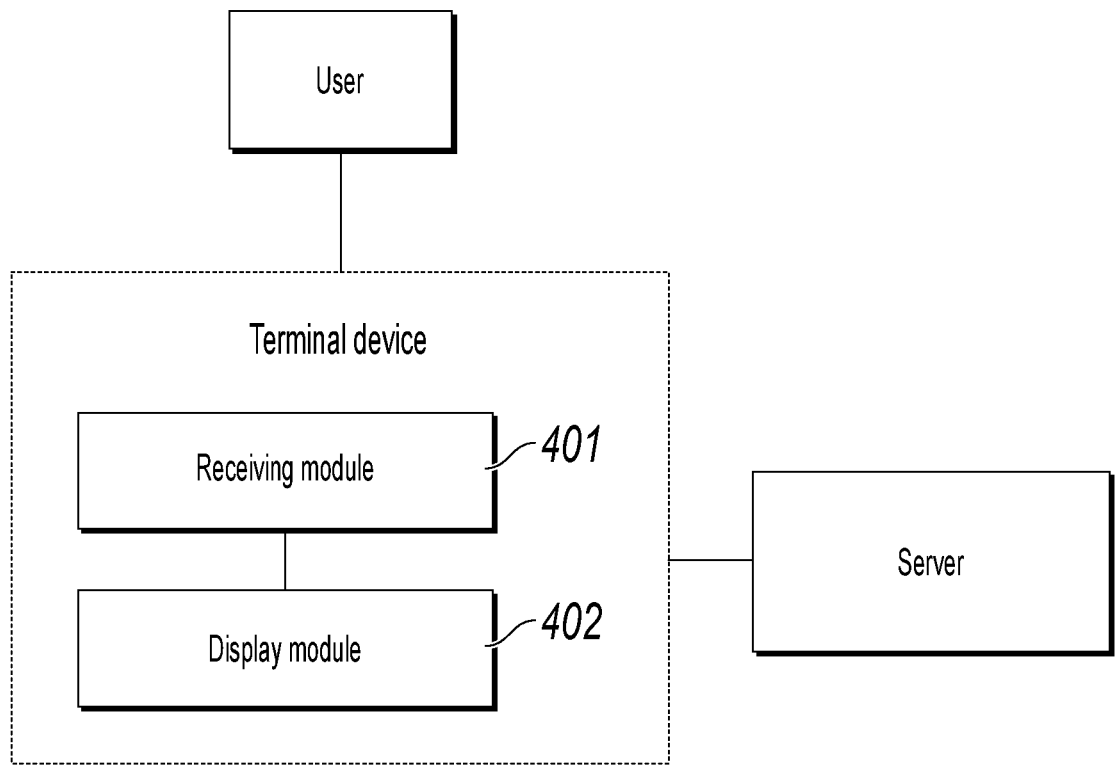
FIG. 4 is a schematic structural diagram illustrating a device for processing data on a terminal device side, according to an implementation of the present application.

As shown in FIG. 4, an implementation of the present application further provides a device for processing data, disposed on a terminal device side, and the device includes the following: a receiving module 401, configured to receive a first rate sent by a server, where the first rate is calculated by the server based on predicted recovery time that is determined by the server when the server detects that an exception occurs in a running status; and a display module 402, configured to display live data based on the first rate.

After a live data service is recovered, the server further sends a second rate to the terminal device, and the receiving module 401 receives the second rate sent by the server. The second rate is calculated by the server based on a recovery time difference that is determined by the server when the server detects that the running status of the live data service returns to normal.

The display module 402 displays the live data based on the second rate.

A person skilled in the art should understand that the implementations of the present disclosure can be provided as a method, a system, or a computer program product. Therefore, the present disclosure can use a form of hardware only implementations, software only implementations, or implementations with a combination of software and hardware. In addition, the present disclosure can use a form of a computer program product that is implemented on one or more computer-usable storage media (including but not limited to a magnetic disk storage, a CD-ROM, an optical memory, etc.) that include computer-usable program code.

The present disclosure is described with reference to the flowcharts and/or block diagrams of the method, the device (system), and the computer program product according to the implementations of the present disclosure. It should be understood that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

These computer program instructions can be stored in a computer readable memory that can instruct the computer or the another programmable data processing device to work in a specific method, so that the instructions stored in the computer readable memory generate an artifact that includes an instruction apparatus. The instruction apparatus implements a specific function in one or more processes in the flowcharts and/or in one or more blocks in the block diagrams.

These computer program instructions can be loaded onto the computer or the another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, a computing device includes one or more processors (CPU), an input/output interface, a network interface, and a memory.

The memory can include a non-persistent memory, a random access memory (RAM), a nonvolatile memory, and/or another form in a computer readable medium, for example, a read-only memory (ROM) or a flash memory. The memory is an example of the computer readable medium.

The computer readable medium includes persistent, non-persistent, movable, and unmovable media that can implement information storage by using any method or technology. Information can be a computer readable instruction, a data structure, a program module, or other data. The computer storage medium includes but is not limited to a phase-change random access memory (PRAM), a static random access memory (SRAM), a dynamic random access memory (DRAM), a random access memory (RAM) of another type, a read-only memory, an electrically erasable programmable read-only memory (EEPROM), a flash memory or another memory technology, a compact disc read-only memory (CD-ROM), a digital versatile disc (DVD), or another optical storage, a cassette, a cassette magnetic disk storage, or another magnetic storage device or any other non-transmission medium. The computer storage medium can be configured to store information that can be accessed by the computing device. Based on the definition in the present specification, the computer readable medium does not include transitory computer-readable media, for example, a modulated data signal and carrier.

It is worthwhile to further note that the term "include", "contain", or any other variant thereof is intended to cover a non-exclusive inclusion, so that a process, a method, an article, or a device that includes a list of elements not only includes those elements but also includes other elements which are not expressly listed, or further includes elements inherent to such a process, method, article, or device. An element preceded by "includes a . . . " does not, without more constraints, preclude the existence of additional identical elements in the process, method, article, or device that includes the element.

A person skilled in the art should understand that the implementations of the present application can be provided as a method, a system, or a computer program product. Therefore, the present application can use a form of hardware only implementations, software only implementations, or implementations with a combination of software and hardware. In addition, the present application can use a form of a computer program product that is implemented on one or more computer-usable storage media (including but not limited to a magnetic disk storage, a CD-ROM, an optical memory, etc.) that include computer-usable program code.

The previous descriptions are merely implementations of the present application, and are not intended to limit the present application. For a person skilled in the art, the present application can have various modifications and changes. Any modifications, equivalent substitutions, improvements, etc. made in the spirit and principle of the present application shall fall within the scope of the claims in the present application.

Figure 5:
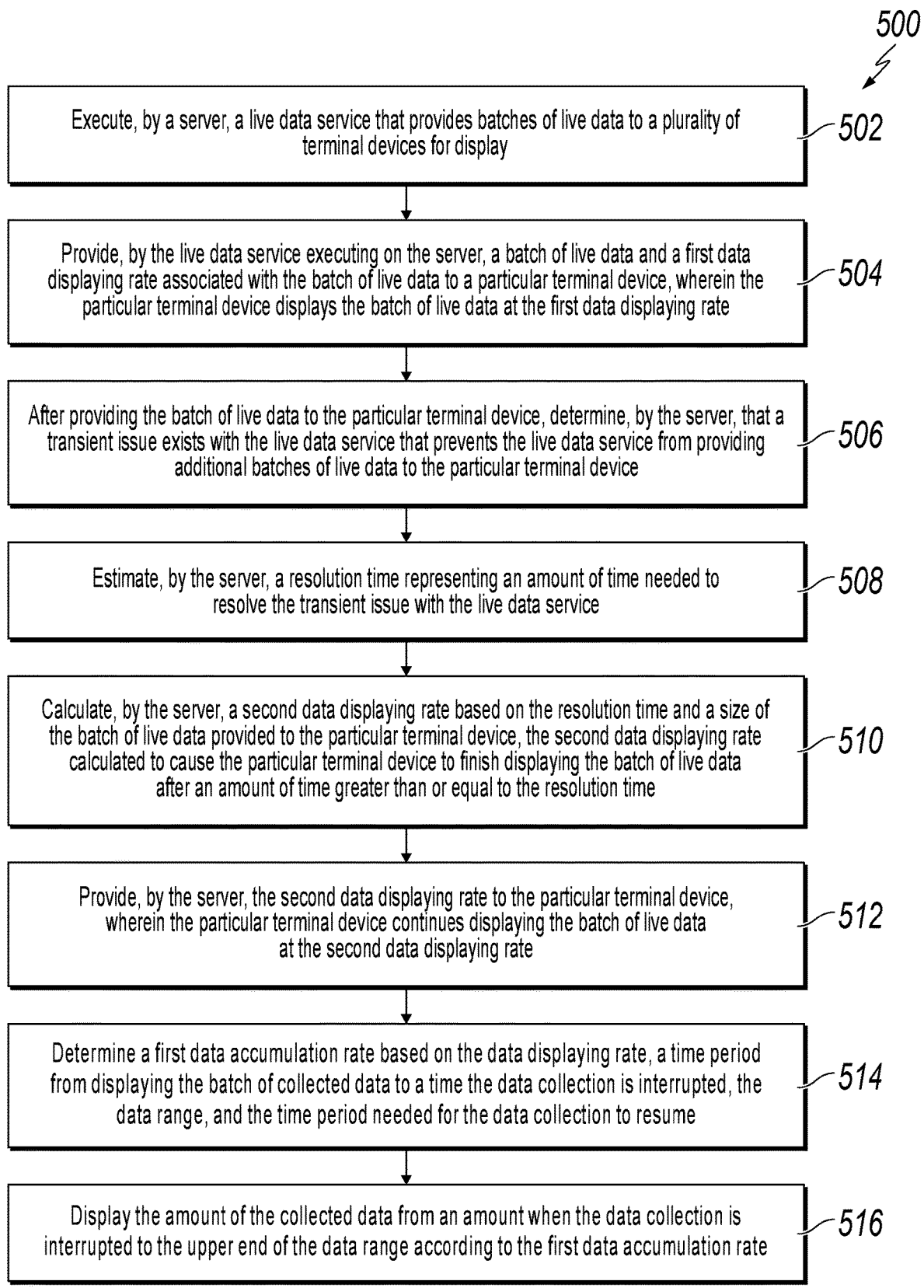
FIG. 5 is a flowchart illustrating an example of a computer-implemented method for processing and displaying data, according to an implementation of the present disclosure.

FIG. 5 is a flowchart illustrating an example of a computer-implemented method 500 for processing and displaying data, according to an implementation of the present disclosure. For clarity of presentation, the description that follows generally describes method 500 in the context of the other figures in this description. However, it will be understood that method 500 can be performed, for example, by any system, environment, software, and hardware, or a combination of systems, environments, software, and hardware, as appropriate. In some implementations, various steps of method 500 can be run in parallel, in combination, in loops, or in any order.

At 502, a server executes a live data service that provides batches of live data to a plurality of terminal devices for display. The live data processing and displaying methods according to some implementations of the present disclosure can be used to display sales data, page views, or visitor volume in real-time during live events on a mobile computing device. As such, the live data can be sales data, page views, or a visitor volume. It will be understood that the data can be other statistics suitable for the particular event type. From 502, method 500 proceeds to 504.

At 504, the live data service executing on the server provides a batch of live data and a first data displaying rate associated with the batch of live data to a particular terminal device, wherein the particular terminal device displays the batch of live data at the first data displaying rate. From 504, method 500 proceeds to 506.

At 506, after providing the batch of live data to the particular terminal device, the server determines that a transient issue exists with the live data service that prevents the live data service from providing additional batches of live data to the particular terminal device. In some implementations, the transient issue is caused by a hardware failure or a software f allure of the server. In some implementations, the particular terminal device stores the batch of live data locally as a data log. From 506, method 500 proceeds to 508.

At 508, the server estimates a resolution time representing an amount of time needed to resolve the transient issue with the live data service. In some implementations, estimating the resolution time is to estimate a time needed for the hardware failure or the software failure to be recovered. From 508, method 500 proceeds to 510.

At 510, the server calculates a second data displaying rate based on the resolution time and a size of the batch of live data provided to the particular terminal device, the second data displaying rate calculated to cause the particular terminal device to finish displaying the batch of live data after an amount of time greater than or equal to the resolution time. From 510, method 500 proceeds to 512.

At 512, the server provides the second data displaying rate to the particular terminal device, wherein the particular terminal device continues displaying the batch of live data at the second data displaying rate. After 512, method 500 ends.

In some implementations, the second data displaying rate is determined based on the first data displaying rate, a data range, the time till the transient issue occurs, and the resolution time. For example, if the first data displaying rate is X, the data range is from D1 to D2, the time till the transient issue occurs is T1, the resolution time is T2, the second data displaying rate, Y1, can be calculated as $Y1=(D2-D1-X*T1)/T2$.

In some implementations, the server determines a new resolution time from the transient issue occurs to the transient issue being resolved if the transient issue is resolved before the resolution time lapses. The server also calculates a third data displaying rate based on the new resolution time, the resolution time, and the first data displaying rate, and provides the third data displaying rate to the particular terminal device, wherein the particular terminal device continues displaying the batch of live data at the third data displaying rate. For example, if the first data displaying rate is X, the data range is from D1 to D2, the second data displaying rate is Y1, the time till the transient issue occurs is T1, the resolution time is T2, the new resolution time is T3, the third displaying rate Y2 can be calculated as $Y2=(D2-D1-X*T1-Y1*T3)/(T2-T3)$. The second displaying rate is less than the third displaying rate because the live data display resumes earlier than estimated. The second displaying rate is also less than the first displaying rate.

Implementations of the subject matter described in this specification can be implemented so as to realize particular advantages or technical effects. For example, implementations of the subject matter permit a live datacasting to perform smoothly without experiencing data hopping, retreating or stagnation. When the live datacasting service resumes, the data displaying rate can be increased to adapt to newly collected data. As such, the described methodology permits technical support staff to have more time for troubleshooting or repairing without the front-end user experiencing service interruption. User experience can be improved accordingly.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

The invention claimed is:

1. A computer-implemented method, comprising:
executing, by a server, a live data service that provides batches of live data to a plurality of terminal devices for display;
providing, by the live data service executing on the server, a batch of live data and a first data displaying rate associated with the batch of live data to a particular terminal device, wherein the particular terminal device displays the batch of live data at the first data displaying rate;
after providing the batch of live data to the particular terminal device, determining, by the server, that a transient issue exists with the live data service that prevents the live data service from providing additional batches of live data to the particular terminal device;
estimating, by the server, a first resolution time representing an amount of time needed to resolve the transient issue with the live data service;
calculating, by the server, a second data displaying rate based on the first resolution time and a size of the batch of live data provided to the particular terminal device, the second data displaying rate calculated to cause the particular terminal device to finish displaying the batch of live data after an amount of time greater than or equal to the first resolution time;
providing, by the server, the second data displaying rate to the particular terminal device, wherein the particular terminal device continues displaying the batch of live data at the second data displaying rate;
determining, by the server, a new resolution time representing the time between when the transient issue occurs to the transient issue being resolved when the transient issue is resolved before the first resolution time lapses;
calculating, by the server, a third data displaying rate based on the new resolution time, the first resolution time, and the first data displaying rate; and
providing, by the server, the third data displaying rate to the particular terminal device, wherein the particular terminal device continues displaying the batch of live data at the third data displaying rate.

2. The computer-implemented method of claim 1, wherein the first displaying rate and the third displaying rate are faster than the second accumulation rate.

3. The computer-implemented method of claim 1, wherein the batch of live data includes at least one of sales data, page views, or a visitor volume.

4. The computer-implemented method of claim 1, wherein the transient issue is caused by a hardware failure or a software failure of the server.

5. The computer-implemented method of claim 4, wherein estimating the first resolution time comprises estimating a time needed for the hardware failure or the software failure to be recovered.

6. The computer-implemented method of claim 1, wherein the particular terminal device stores the batch of live data locally as a data log.

7. A non-transitory computer-readable storage medium coupled to one or more computers and having instructions stored thereon which are executable by the one or more computers to:
execute, by a server, a live data service that provides batches of live data to a plurality of terminal devices for display;
provide, by the live data service executing on the server, a batch of live data and a first data displaying rate associated with the batch of live data to a particular terminal device, wherein the particular terminal device displays the batch of live data at the first data displaying rate;
after providing the batch of live data to the particular terminal device, determine, by the server, that a transient issue exists with the live data service that prevents the live data service from providing additional batches of live data to the particular terminal device;
estimate, by the server, a first resolution time representing an amount of time needed to resolve the transient issue with the live data service;
calculate, by the server, a second data displaying rate based on the first resolution time and a size of the batch of live data provided to the particular terminal device, the second data displaying rate calculated to cause the particular terminal device to finish displaying the batch of live data after an amount of time greater than or equal to the first resolution time;
provide, by the server, the second data displaying rate to the particular terminal device, wherein the particular terminal device continues displaying the batch of live data at the second data displaying rate;
determine, by the server, a new resolution time representing the time between when the transient issue occurs to the transient issue being resolved when the transient issue is resolved before the first resolution time lapses;
calculate, by the server, a third data displaying rate based on the new resolution time, the first resolution time, and the first data displaying rate; and
provide, by the server, the third data displaying rate to the particular terminal device, wherein the particular terminal device continues displaying the batch of live data at the third data displaying rate.

8. The non-transitory computer-readable storage medium of claim 7, wherein the first displaying rate and the third displaying rate are faster than the second accumulation rate.

9. The non-transitory computer-readable storage medium of claim 7, wherein the batch of live data includes at least one of sales data, page views, or a visitor volume.

10. The non-transitory computer-readable storage medium of claim 7, wherein the transient issue is caused by a hardware failure or a software failure of the server.

11. The non-transitory computer-readable storage medium of claim 10, wherein estimating the first resolution time comprises estimating a time needed for the hardware failure or the software failure to be recovered.

12. The non-transitory computer-readable storage medium of claim 7, wherein the particular terminal device stores the batch of live data locally as a data log.

13. A system, comprising:
one or more computers; and
one or more computer-readable memories coupled to the one or more computers and having instructions stored thereon which are executable by the one or more computers to:

execute, by a server, a live data service that provides batches of live data to a plurality of terminal devices for display;

provide, by the live data service executing on the server, a batch of live data and a first data displaying rate associated with the batch of live data to a particular terminal device, wherein the particular terminal device displays the batch of live data at the first data displaying rate;

after providing the batch of live data to the particular terminal device, determine, by the server, that a transient issue exists with the live data service that prevents the live data service from providing additional batches of live data to the particular terminal device;

estimate, by the server, a first resolution time representing an amount of time needed to resolve the transient issue with the live data service;

calculate, by the server, a second data displaying rate based on the first resolution time and a size of the batch of live data provided to the particular terminal device, the second data displaying rate calculated to cause the particular terminal device to finish displaying the batch of live data after an amount of time greater than or equal to the first resolution time;

provide, by the server, the second data displaying rate to the particular terminal device, wherein the particular terminal device continues displaying the batch of live data at the second data displaying rate;

determine, by the server, a new resolution time representing the time between when the transient issue occurs to the transient issue being resolved when the transient issue is resolved before the first resolution time lapses;

calculate, by the server, a third data displaying rate based on the new resolution time, the first resolution time, and the first data displaying rate; and provide, by the server, the third data displaying rate to the particular terminal device, wherein the particular terminal device continues displaying the batch of live data at the third data displaying rate.

14. The system of claim 13, wherein the first displaying rate and the third displaying rate are faster than the second accumulation rate.

15. The system of claim 13, wherein the batch of live data includes at least one of sales data, page views, or a visitor volume.

16. The system of claim 13, wherein the transient issue is caused by a hardware failure or a software failure of the server.

17. The system of claim 16, wherein estimating the first resolution time comprises estimating a time needed for the hardware failure or the software failure to be recovered.

* * * * *